Figure 1:
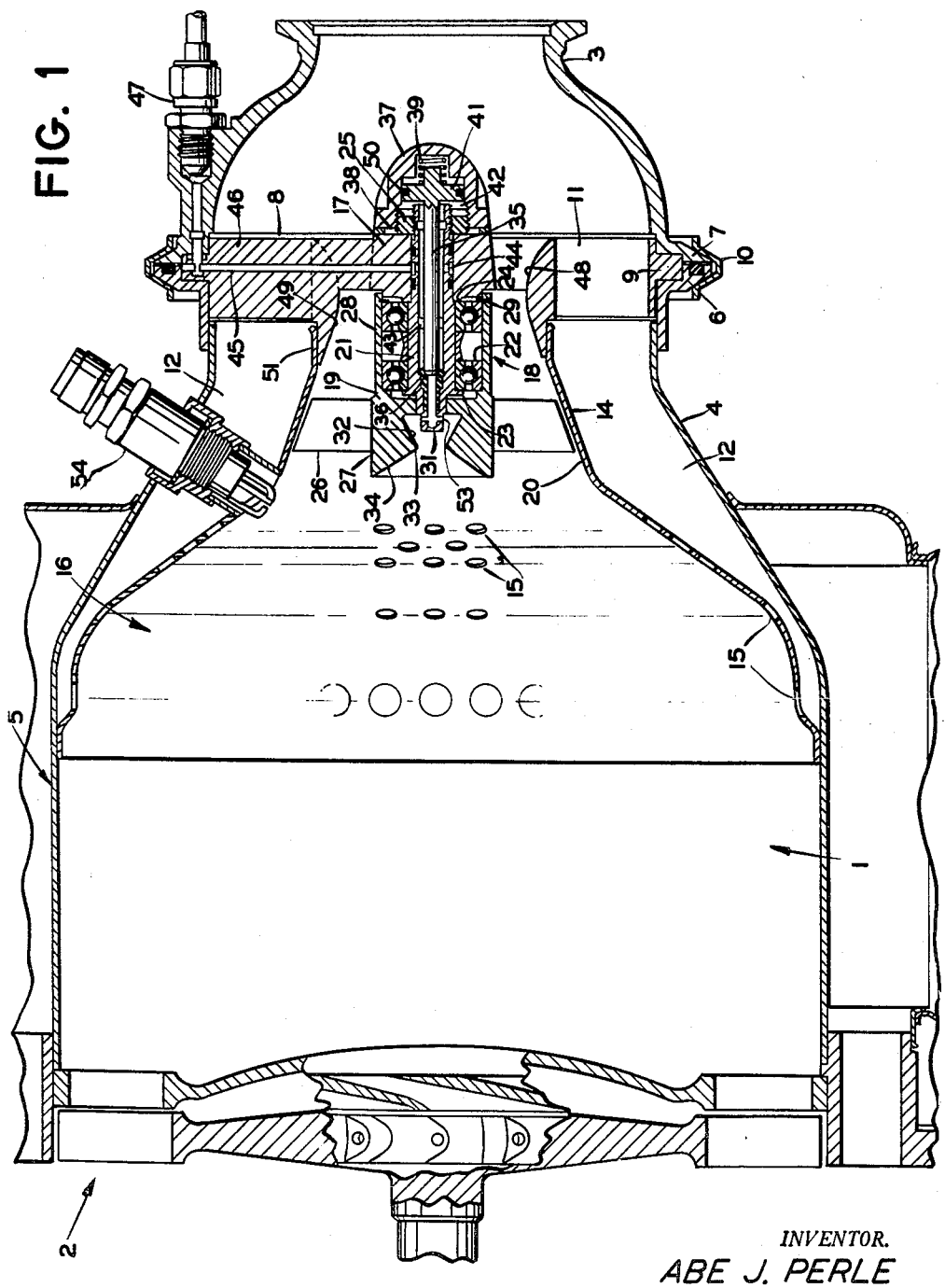

May 31, 1960 A. J. PERLE 2,938,345
COMBUSTION FUEL ATOMIZER
Filed July 27, 1954 2 Sheets-Sheet 1

INVENTOR.
ABE J. PERLE
BY
Nicholas J. Garofalo
ATTORNEY

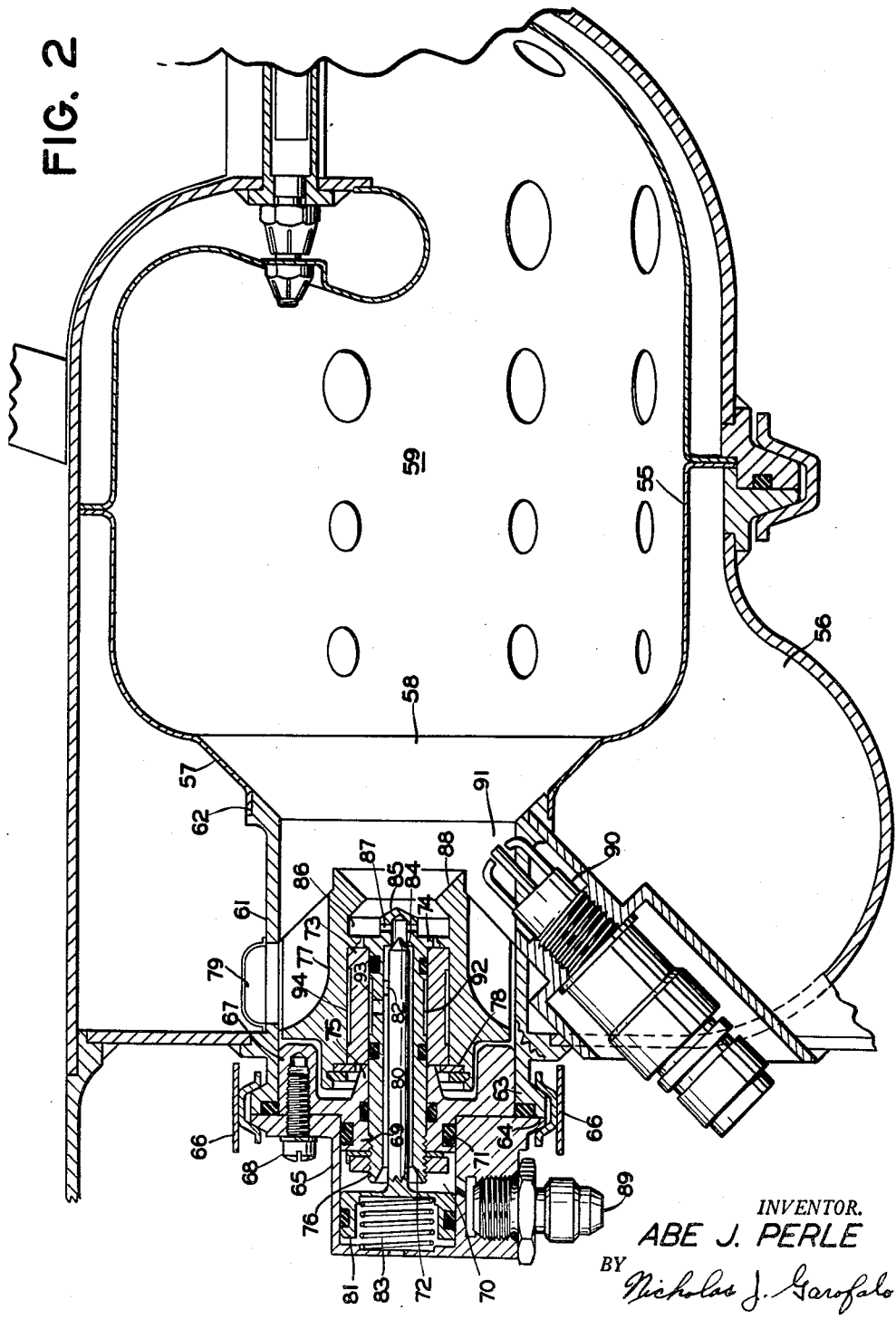

United States Patent Office

2,938,345
Patented May 31, 1960

2,938,345

COMBUSTION FUEL ATOMIZER

Abe J. Perle, Verona, N.J., assignor to Bendix Aviation Corporation, Teterboro, N.J., a corporation of Delaware Filed July 27, 1954, Ser. No. 446,087

6 Claims. (Cl. 60—39.74)

This invention pertains to new and useful improvements in combustion fuel atomizers. It is particularly concerned with an air-driven centrifugal fuel atomizer which, though subject to wide application, finds particular use with a combustion turbine engine.

A feature of the invention is the simplicity in the arrangement of its various cooperating parts and in the beneficial results obtainable therefrom.

A further feature of the invention is the novel cooperation of air spinning means with a method of fuel distribution, whereby fuel passing to the combustion chamber is thoroughly atomized.

Another feature of the invention is provided by the novel arrangement of the various elements thereof, whereby the air employed in driving a fuel spinner is utilized for primary mixing with the fuel.

A still further feature of the invention lies in novel fuel spinner means, whereby fuel emitted to the combustion chamber for mixing with combustion air is broken up into a finely atomized hollow cone spray for ignition before passing into the air rich main combustion chamber of the turbine engine.

Another feature lies in the manner in which bearings supporting the fuel spinner are cooled and lubricated.

An object of the invention is, therefore, to provide a finely atomized fuel spray and an intimate mixture of the fuel with air for primary combustion prior to the mixture and burning gases thereof passing into the air rich main combustion chamber of a hot gas turbine engine.

Another object of the invention is to provide efficient and practical fuel atomizing means of the air-driven type for providing an intimate mixture of fuel and air for primary combustion prior to the mixture passing into the main combustion chamber of a turbine engine.

The foregoing and other objects and advantages of this invention will appear more fully hereinafter from a consideration of the detailed description which follows, taken together with the accompanying drawings, wherein an embodiment of the invention is illustrated. It is to be expressly understood, however, that the drawings are for purposes of illustration and description, and are not to be construed as defining the limits of the invention.

In the drawings:

Fig. 1 is a longitudinal section through fuel atomizing means associated with the combustion chamber of a turbine engine; and Fig. 2 is a longitudinal section showing a modified form of the invention.

In describing the invention in further detail, reference is directed to the drawings, now particularly to Fig. 1, wherein there is disclosed the combustion chamber 1 of a hot gas turbine engine 2. Pressurized air for combustion is axially supplied to the combustion chamber through an axial extension 3 of a tapered neck portion 4 of the shell 5 of the combustion chamber. A peripheral flange 6 about the end of the neck portion 4 abuts with a similar flange 7 about the inner end of extension 3. Interposed between the intake extension 3 and the combustion chamber is a spider disk member 8. The latter carries a peripheral flange 9 which is received in an annular recess formed between the abutting flanges 6, 7. A clamp 10 secured about the abutting flanges holds extension 3 to shell 4 and secures the position of the spider member 8.

The spider member has a plurality of outer radial openings 11 through the body thereof, through which intake-air flows from the extension 3 to a space 12 surrounding an inner liner 14 of the combustion chamber. From space 12 the air flows through a plurality of apertures 15 in the liner to the main portion 16 of the combustion chamber.

Supported axially of the hub 17 of the spider member is a fuel atomizing device 18 which carries on its inner end a spinner 19. The latter extends into a conical neck or narrowed ante-portion 20 of the combustion chamber provided by a suitable approach radius of the liner 14. This neck portion provides an ante-chamber for primary fuel-air mixture and combustion prior to the mixture passing into the main section of the combustion chamber downstream thereof. The fuel atomizing device includes an elongated hollow stud 21 which extends axially through the spider hub 17 into the conical ante-portion 20 of the combustion chamber. Stud 21 is held stationary in the hub and an extended portion thereof serves as a support for bearing means 22 on which the spinner 19 rotates. The bearing means is mounted on the stud intermediately of a flange 23 of the latter and a shoulder 24 of the inner face of the spider hub. Nut means 25 threaded onto the projecting opposite end of the stud is tightened up against the outer face of the spider hub, whereby the bearing means is secured between flange 23 and shoulder 24.

The spinner 19 includes blades 26 radially mounted about a hub 27, the ends of the blades being in close proximity to the liner wall 14. The hub 27 includes a rearwardly extending sleeve portion 28 which is fitted tight upon the bearing means for rotatable movement about stud member 21. A snap ring 29, fitted into a groove of an overhanging portion of sleeve 28, limits against the bearing means to prevent the spinner from escaping free of the latter.

A reduced end 31 of stud 21 projects axially through the wall of the spinner hub into an annulus 32 of the latter. The annulus or recess 32 provides a nozzled portion or throat 33 which expands outward to provide a cone exit 34 into the combustion chamber, the outer end of which cone is of relatively greater diameter than that of the annulus.

An elongated pintle 35 extends axially of the hollow stud, and the tapered end of the pintle closes upon a seat 36 at the reduced end of stud 21. The opposite end of the pintle projects through the rear end of stud 21 into a recess of a cap 37. The latter is threaded upon the stud nut means 25 and sealed at 38 against the spider hub.

A spring 39 centered by a slight extension of the pintle limits against a peripheral flange 41 of the pintle to bias the latter to closed position upon its seat. When the pintle is seated, a slight space 42 separates flange 41 from the end wall of stud 21 and from the nut means 25.

Pintle 35 is of relatively narrower diameter than the hollow interior of stud 21 through which it extends. Peripheral projections 43 of stud 21 space the latter from the stud chamber wall and serve to support and guide the pintle in its axial movements relative to the seat. The peripheral flange member 41 contacting the wall of the cap, supports and guides the pintle at its rear end.

A peripheral channel 44 about stud 21 communicates the stud chamber with a passage 45 extending through a fin 46 of the spider body and communicating through a fitting 47 with a source of pressurized fuel, not shown.

The spider body further includes a plurality of radial openings 48 about its hub. These are relatively smaller than the hub openings 11. Openings 48 are throated or nozzled by convexed elements 49. The latter extend inward beyond the inner wall of the spider body and serve as a support for the annular terminal end 51 of the liner 14. The nozzled passages 48 provide high velocity air flow from the intake passage axially to the blades of the spinner.

In the operation of the mechanism described, pressurized bleed air from a proper source, not shown, is fed into the intake passage 3. Some of the air passes around the liner 14 and through the apertures 15 thereof to the main portion 16 of the combustion chamber to a point beyond the exit end of the spinner cone 34. Some of the pressure bleed air passes axially through the nozzled passages 48 at increased velocity and axially across the spinner blades to drive the spinner, the spinner as a consequence rotating on the bearing means about the hollow stud 21. Pressurized fuel fed through the fitting 47 flows into the hollow interior of stud 21 about the pintle, and then to the space 42. Sealing means 50 about flange 41 prevents leakage to the rear of the latter. Upon the fuel pressure reaching a predetermined degree, it forces the pintle against the bias of spring 39 to open position. Whereupon, fuel issues through cross holes 53 in the reduced end of stud 21, the terminal end of the reduced stud end being closed. The issuing fuel is caught in the annulus 32 due to the centrifugal effects of the spinner. The rotary motion of the latter causes the fuel to fill the annulus completely to a uniform depth. When the latter is completely filled, the fuel overflows uniformly through the throat and out into the cone section 34 for distribution to the combustion chamber. Continued centrifugal action, imparted by the radially rotating spinner assembly causes the fuel to fly outward along the distributor cone surface, the fuel finally leaving the cone edge in the form of a finely atomized hollow cone spray. The fuel spray is immediately contacted by the air exhausted from the spinner, and the one is intimately mixed with the other. The air exhausted from the spinner and mixing with the fuel is called primary combustion air, as it is the first to mix with the fuel. Ignition of the mixture of primary air and fuel is accomplished by a nearby spark plug 54, positioned to ignite the primary fuel air mixture. The sparking points of the plug are located immediately to the rear of the atomized fuel cone at the point where fuel and the spinner air first mix. Once ignition of the primary mixture is accomplished, further bleed air introduced to the combustion chamber through the multitude of apertures 15 throughout the surface of the liner 14 mixes with the burning gaseous mass. This added air serves to complete the combustion of the fuel and to dilute the temperature of the final products of combustion to a temperature for safe application to the turbine wheel 2 for long duration operation of the latter.

It is to be noted in the above form of the invention the spinner blades are axially attacked by the intake air to the combustion chamber, and that the hot gas flow to the turbine engine wheel is axial.

In Fig. 2 there is shown a modified form of the invention serving to provide atomized fuel for primary air combustion to a toroidal type combustion chamber. The latter includes a perforated inner liner 55 and a surrounding air flow passage 56 communicating with an inlet scroll, not shown. The inner liner provides, as shown, a conical side extension 57 to provide a cone shaped ante-chamber 58 in which primary combustion of atomized fuel takes place before the latter enters from the cone into the air rich main combustion chamber 59.

The fuel atomizing assembly includes an elongated sleeve 61 axially disposed through the outer skin of the combustion chamber. The sleeve provides an annular shoulder 62 at its inner end upon which the terminal marginal edge of the conical extension of the inner liner is supported. The outer peripheral end of the sleeve provides a flange 63 which abuts a marginal edge of an extended flange 64 of a housing or cap 65. The flanges are secured together by an encompassing clamp 66.

A disc block member 67 has its peripheral surface in contact with the inner wall of sleeve 61 and has its face portion bolted at 68 to the extended flange 64 of the housing. A hub portion 69 of block 67 extends partway into a cylindrical chamber 70 provided by cap 65. The peripheral surface of the hub extension 69 is in sealed contact at 71 with the wall of chamber 70.

The hub 69 supports a hollow stud member 72. On an extended projection of the latter is mounted a porous bearing, here, a graphite bearing 73. It is carried between an end flange 74 of the stud and a slight tapered projection 75 of the hub. Lock nut and washer means 76 on the opposite end of the stud secures the stationary position of the latter and tightens the bearing fast between the flange and the hub. Mounted for rotatable movement upon the bearing is a small air turbine or spinner 77. A flange of the latter and suitable snap ring elements at 78 holds the turbine on the bearing. The spinner is of the inward radial flow type and is tangently driven by bleed pressure air passing through louvered openings 79 of sleeve 61.

Stud 72 provides a hollow interior or chamber in which a pintle 80 of relatively smaller diameter is guided in its movements by a piston flange 81 at one end that is located in the cap chamber 70, and by radial projections 82 near the other end. The pintle is normally biased by a spring 83 to closed position upon a seat 84 of the stud chamber. Stud 72 includes a reduced end 85 which communicates the chamber thereof through cross holes 87 with an annular recess 86 in the hub of the spinner 77. The recess is provided with an expansion conical distributing end 88 of relatively greater diameter.

In the operation of the device pressurized fuel passing through the cap fitting 89 enters the chamber 70 to force the pintle from its seat and to provide fuel flow through the interior of the stud to the recess 86 through the cross holes 87. The fuel issues from the distributing expansion cone 88 in a finely atomized cone spray or screen and mixes intimately with the air exhaust of the spinner. Ignition is accomplished in the ante-chamber 58 by the spark plug 90 which is angularly disposed through sleeve 61 and has its sparking points 91 just beyond the atomized fuel cone at the point where the fuel and spinner exhaust air first mix. The burning gases pass from the conical ante-chamber 58 into the air rich combustion chamber 59 for further combustion. In this manner, the fuel is given an opportunity to mix with air, ignite and complete the primary burning process at a more favorable air-fuel ratio before emerging from the conical ante-chamber into the high-velocity, air-rich combustion chamber.

A feature of this form of the invention is the manner whereby the bearing means is cooled. It is to be noted that an annulus 92 about the periphery of the stud 72 and located immediately beneath the bearing 73 is communicated by a passage 93 with the hollow interior of the stud. Another annulus 94 recessed about the peripheral surface of the bearing and substantially the length thereof communicates through the pores in the body of the bearing with the inner annulus 92. By this arrangement fuel passing through the stud interior or chamber communicates through the passage 93 with the stud annulus 92. The fuel fills the latter and soaks through the pores to the outer annulus 94 to cool the bearing surface. By this arrangement, the bearing means 73 will be effectively cooled and protected from any harmful effects that might otherwise be caused by air at elevated temperatures. The liquid film provided in this manner to the bearing surface also serves to reduce the coefficient of friction of the graphite bearing.

It is to be appreciated that the above type bearing

What is claimed is:

1. Means for providing primary combustion to the main combustion chamber of a hot gas turbine engine, the combustion chamber including a conical ante-chamber, a block member walling off one end of the ante-chamber, a fuel atomizing member including a shaft axially supported at one end in the block member and extending at the other into the ante-chamber, a turbine rotatably mounted on the extended shaft and having the ends of its blades in close proximity to the surrounding wall of the ante-chamber, the turbine carrying a hub member having an annular cavity therein, which cavity is reduced at its outer end to provide a throat and which throat expands conically outward, passage means extending axially through the shaft and then radially out to the annular cavity for communicating radial flow of pressurized fuel to the latter cavity, means for providing a flow of pressurized air to the conical ante-chamber to drive the turbine, the radial fuel supply to the cavity filling the latter, overflowing through the throat and issuing from the outer edge of the conically expanded throat in the form of a hollow cone spray consequent upon the centrifugal action imparted to the fuel with the rotation of the turbine, the turbine in association with the close surrounding wall of the conical chamber adapted to exhaust the driving air outward to impinge and mix with the issuing fuel cone spray, spark plug means positioned for igniting the resultant mixture immediately prior to the mixture passing from the ante-chamber to the main combustion chamber, and means providing a flow of pressure air the main combustion chamber beyond the ante-chamber.

2. In means as in claim 1, wherein the turbine is rotatably borne by porous graphite bearing means and the latter is carried fast on the extended end of the shaft, and means is provided for cooling the bearing means and reducing the coefficient of friction of the bearing surface, the cooling means comprising an extended peripheral recess about the extended shaft and beneath the bearing, lateral port means communicating the axial passage of the shaft with the peripheral recess, and a peripheral extended recess about the bearing, so constructed and arranged that some of the fuel flow through the axial passage flows to the peripheral recess about the shaft and sweats through the pores of the bearing to the peripheral recess of the latter whereby cooling and reduction of the coefficient of friction of the bearing surface is effected.

3. In a fuel atomizer as in claim 1, wherein the bearings means is characterized as formed of porous graphite material and includes an elongated peripheral recess and the hollow shaft includes a similar peripheral recess ported radially through the shaft to the hollow part of the latter, some of the fuel passing through the hollow shaft adapted to flow to the peripheral recess about the shaft and to sweat through the pores of the bearing to the peripheral surface of the latter to effectively cool the bearing, as well as lubricate it.

4. A fuel spinner comprising a stationary elongated hollow shaft opening out at one end into a chamber, porous bearing means mounted on the shaft, an air driven spinner having a hub carried for rotatable movement on the porous bearing, a portion of the hub overhanging a closed end of the shaft and providing a throated recess expanding conically outward to the outside, the closed end of the shaft having cross holes radially communicating the hollow shaft with the throated recess, the chamber communicating through the hollow shaft with a radial passage in the shaft wall leading to the porous bearing, an elongated pintle valve axially slidable in the hollow shaft in spaced circumferential relation to the inner wall of the latter and having an end engageable with a seat for closing off communication of the cross holes with the hollow shaft, a piston head at the opposite end of the pintle, spring means at the piston head urging the pintle to closed position on its seat, a portion of the pintle projecting from the open end of the shaft whereby a space is provided in the chamber between the piston head and the open end of the shaft, and port means communicating this space with a source of pressurized fuel supply.

5. A fuel spinner comprising a stationary elongated hollow shaft opening out at one end into a chamber, bearing means mounted on the shaft, an air driven spinner having a hub carried for rotatable movement on the bearing means, a portion of the hub overhanging a closed end of the shaft and providing a throated recess expanding conically outward to the outside, the closed end of the shaft having cross holes radially communicating the hollow shaft with the throated recess, an elongated pintle valve axially slidable in the hollow shaft in spaced circumferential relation to the inner wall of the shaft and having an end engageable with a seat for closing off communication of the cross holes with the hollow shaft, a piston head at the opposite end of the pintle, spring means at the piston head urging the pintle to closed position on its seat, a portion of the pintle projecting from the open end of the shaft whereby a space is provided in the chamber between the piston head and the open end of the shaft, and port means communicating this space with a source of pressurized fuel supply.

6. The method of obtaining combustion comprising discharging into a combustion chamber having a longitudinal axis fuel as an outwardly moving swirling fuel spray which is at an acute angle to said axis, dividing a combustion air into a first part and a second part, accelerating said first part to form a high speed air flow, utilizing the energy of said high speed air flow to effect said swirling spray of fuel, impinging immediately said high-speed air as a turbulent annular flow which is moving substantially parallel to said axis and has rotational movement directly on substantially all of the rear part of said swirling fuel spray, and supplying said second part of said combustion air to said chamber downstream of said step of impinging.

References Cited in the file of this patent

UNITED STATES PATENTS

| | | |
|---|---|---|
| 1,735,490 | Barley | Nov. 12, 1929 |
| 1,784,747 | Peckelhoff | Dec. 9, 1930 |
| 2,165,191 | Kucher | July 4, 1939 |
| 2,242,787 | Liberherr | May 20, 1941 |
| 2,483,975 | Hoogendam | Oct. 4, 1949 |
| 2,525,206 | Clarke | Oct. 10, 1950 |
| 2,559,792 | Pietri | July 10, 1951 |
| 2,560,207 | Berggren et al. | July 10, 1951 |
| 2,566,319 | Deacon | Sept. 4, 1951 |
| 2,602,292 | Buckland et al. | July 8, 1952 |
| 2,657,745 | Bleecker | Nov. 3, 1953 |
| 2,705,401 | Allen et al. | Apr. 5, 1955 |

FOREIGN PATENTS

| | | |
|---|---|---|
| 1,027,611 | France | Feb. 18, 1953 |

(Corresponding British Patent 713,863, Aug. 18, 1954)